United States Patent [19]

Fang

[11] Patent Number: 5,287,175
[45] Date of Patent: Feb. 15, 1994

[54] METHOD AND APPARATUS FOR NEGATIVE-TO-POSITIVE VIDEO CONVERSION

[76] Inventor: Gang Fang, 771 University Village, Salt Lake City, Utah 84108

[21] Appl. No.: 42,673

[22] Filed: Apr. 5, 1993

[51] Int. Cl.⁵ ............................................. H04N 9/11
[52] U.S. Cl. .................................... 348/97; 352/1; 348/373; 348/64; 348/692
[58] Field of Search ............... 358/54, 214, 41, 11, 358/140, 34, 171, 60, 97, 229; 352/1, 129, 244; 355/123; H04N 9/11

[56] References Cited

U.S. PATENT DOCUMENTS

| | | | |
|---|---|---|---|
| 3,751,580 | 8/1973 | Metzger | 358/54 |
| 4,866,513 | 9/1989 | Takahashi | 358/54 |
| 5,160,948 | 11/1992 | Bae | 352/1 |

*Primary Examiner*—James J. Groody
*Assistant Examiner*—Sherrie Hsia

*Attorney, Agent, or Firm*—Terry M. Crellin

[57] ABSTRACT

A system is disclosed for electronically processing negative composite video signals, wherein the negative composite video signals correspond to a negative image as produced by the projection of negative photographic film. The negative composite video signals are converted to positive composite video signals. The entire portion of the negative composite video signal between adjacent horizontal blanking portions is electronically inverted. The horizontal blanking portions of the negative composite video, which include the color burst signal, are not inverted. The composite signal that results includes the blanking portions, having the color burst signal, in their original, unaltered state. The image portion of the resulting composite signal, i.e., the portions of the resulting composite signal between the horizontal blanking portions, is inverted, and the resulting composite video signal is thus converted from negative to positive state.

11 Claims, 6 Drawing Sheets

METHOD AND APPARATUS FOR NEGATIVE-TO-POSITIVE VIDEO CONVERSION

BACKGROUND OF THE INVENTION

1. Field of the Invention

The present invention relates to a method and apparatus for processing a video signal. More particularly, the invention relates to a method and apparatus for converting a negative video signal to a positive signal, wherein the conversion apparatus receives video signals representative of a negative image, such as a image recorded on a negative film, from image detector such as video camera and converts the video signals to corresponding video signals representative of positive images ready to be viewed on a video monitor.

2. State of the Art

Apparatus for converting photographic pictures, such as motion picture film, to video recordings is well known in the present day state of the art. However, the apparatus, especially low cost models designed for family use, do not have the ability to convert negative photographic film to positive video signals. This is due to the simple fact that there has been no practicable method proposed for the negative-to-positive conversion of video signals in low cost apparatus designed for family use. Professional equipment has been available for negative-to-positive conversion wherein individual components of the composite video signal (i.e. the luminance component and the chrominance component) are separated, and the polarity of each component is reversed by a electronic inverter. The separate, reversed signals are then combined back together to form the composite video signal format. The complexity of the prior art conversion of negative-to-positive signals results in obvious disadvantages. First, the cost is high. Use of apparatus for such negative-to-positive conversion has been limited almost exclusively to photo labs or other professional film developing facilities. Second, each signal processing element in the system inevitably introduces noise and distortions to the signal. The conversion method of the prior art provides no solution to this problem. Third, numerous elements in the conversion systems of the prior art impose higher degrees of difficulties in adjusting the variables involved. Last but not least, the method of the prior art has undesired signal format dependency due to the separation of color difference components. This means a conversion device designed for a PAL system can not be used on an NTSC system without special modifications and vise versa.

3. Objectives

A principal objective of the invention is to provide a method and apparatus for negative-to-positive conversion of video signals that is simple, effective and low in cost.

A particular objective of the present invention is to provide such a method and apparatus for negative-to-positive conversion that is simple to operate and requires very little adjustment.

Another objective of the present invention is to provide such a method and apparatus for negative-to-positive conversion that can be used independent of signal format.

BRIEF DESCRIPTION OF THE INVENTION

The above objectives are achieved in accordance with the present invention by providing a novel system in which the composite video signal corresponding to the negative image as produced by the projection of negative photographic film is processed by electronically inverting the entire portion of the composite video signal between two adjacent horizontal blanking portions of the composite signal. The horizontal blanking portions which include the color burst signal are not inverted. By inverting the composite signal between two adjacent horizontal blanking portions of the composite signal, both the luminance portion and the chrominance portion of the composite video signal are inverted simultaneously. The composite signal that results includes the blanking portions, including the color burst signal, in their original, unaltered state. The luminance and chrominance are inverted, and the resulting composite video signal has been converted from negative to positive state. The conversion is achieved with inexpensive circuitry and without the necessity of separating the luminance and chrominance portions from the composite video signal.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

It is well known that in a video signal receiving/displaying device such as a TV receiver or a video monitor, the color signals are decoded from the composite video signal by referencing a color subcarrier. The frequency and phase of the subcarrier relative to the chrominance signal must be exactly the same as in the encoder. This is ensured by reconstructing the color subcarrier from the color burst signal which provides information about the frequency and the phase of the color subcarrier. Relative phase shifting of 180 degree between the color subcarrier and the chrominance signal will result in the inversion of the color signals. As mentioned above, the phase and the frequency of the reconstructed color subcarrier are solely determined by the corresponding properties of the color burst signal which is embedded on the composite video signal. Therefore, the phase shift between the color burst signal and the chrominance signal is equivalent to the shift between the color subcarrier and the chrominance signal.

It has now been found that the inversion of the signal segments between every two adjacent horizontal blanking signals will result in the inversion of both the luminance portion and the chrominance portion of the composite video signal. The inversion of the chrominance portion is equivalent to the introduction of a 180 degree phase shift between the chrominance signal and the color burst signal. The inversion of the luminance component and the 180 degree phase shift of chrominance component is exactly what's needed to accomplish the negative-to-positive conversion, and thus the conversion can unexpectedly be accomplished without the separation of the luminance and chrominance portions from the composite video signal as taught in the prior art.

Figure 1:
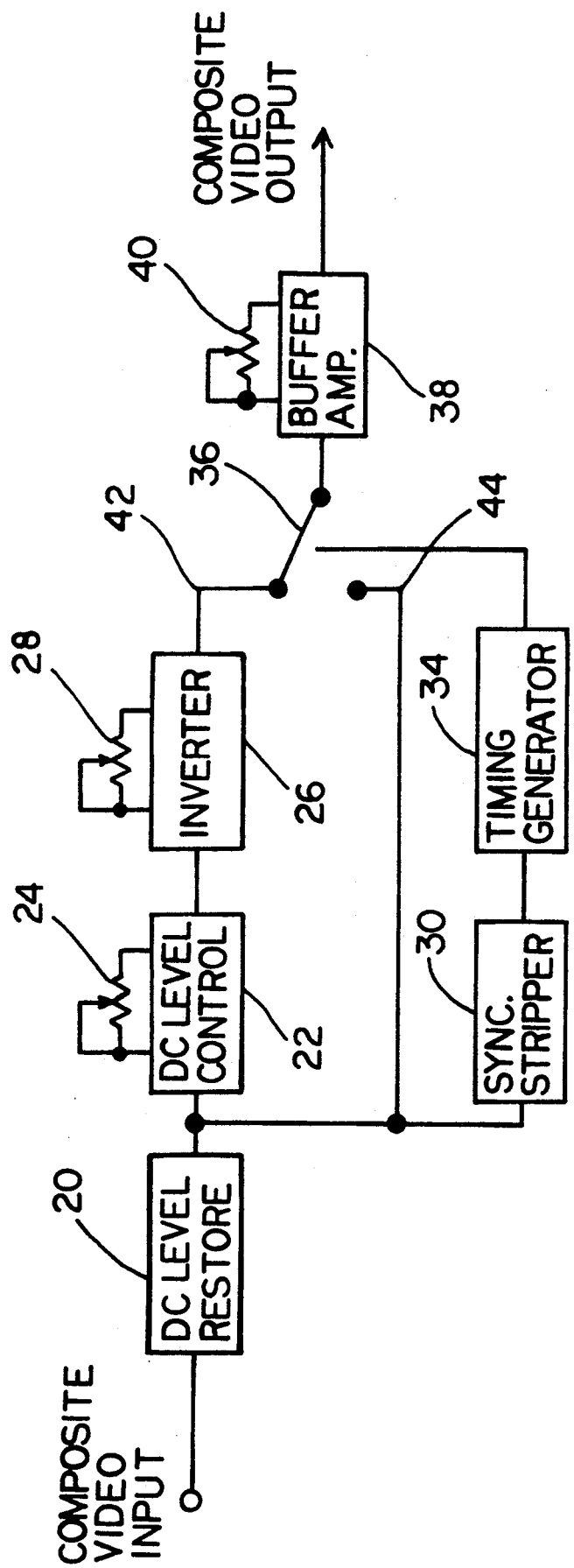
FIG. 1 is a schematic block diagram showing a system for negative-to-positive conversion of video signals in accordance with the present invention.

Reference is now made to FIG. 1 which is a diagrammatic illustration of a negative-to-positive conversion system in accordance with the present invention. Input signal from video signal sources such as a video camera is provided to a DC level restoring circuit (also known as black level clamp circuit) 20. The output of circuit 20 is simultaneously routed to a DC level control circuit 22, a signal selector 36 and to a sync stripper circuit 30.

In the DC level control circuit 22, the black level of the output signal can be adjusted electrically in reference to the input signal by an adjusting device 24. The output of circuit 22 is fed into an inverter 26. The gain of the inverter can be adjusted by an adjusting device 28. The inverted signal 42, as well as the original signal 44 are sent to a signal selector 36. The signal selector 36 is responsive to a signal coming from the sync stripper 30 through a timing generator 34. The inverted signal 42 and the original signal 44 are selectively passed through the signal selector 36 according to the timing signal provided from the timing generator 34 which receives input from the sync stripper circuit 30. The output of the signal selector 36 is amplified by the buffer amplifier 38. The gain of the buffer amplifier can be adjusted by an adjusting device 40.

Figure 2A:
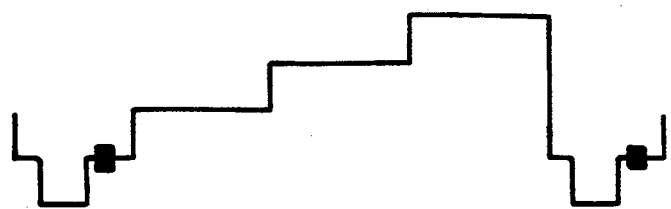
FIGS. 2A–2E show timing control wave forms of signals generated and used in the system of FIG. 1.
Figure 2B:
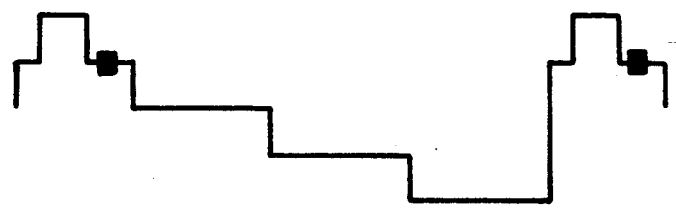
Figure 2C:
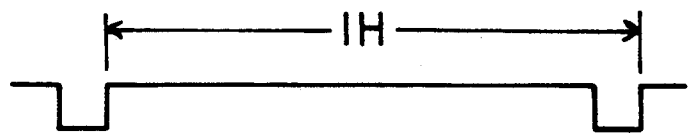

Reference is now made to FIGS. 2A-2E which illustrate the key timing waveforms of the negative-to-positive conversion system of the present invention. The original signal is shown in FIG. 2A, with only one horizontal scanning period of the signal being shown. FIG. 2B shows the output of the inverter 26. The sync stripper 30 is adapted to separate the sync pulses from the composite video signal. One horizontal scanning period (1h) is shown in the wave form of FIGS. 2A through 2E.

Figure 2D:
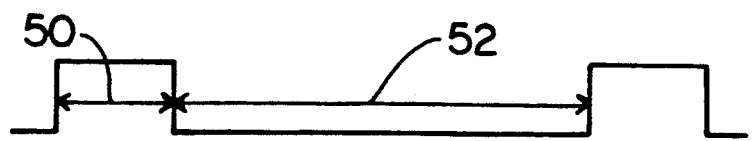
Figure 2E:
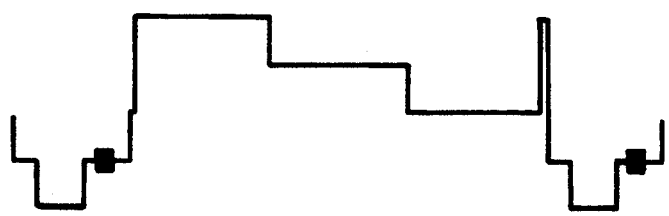

The output of the sync stripper 30 is used by the timing generator 34 to generate the switching signal that is shown in FIG. 2D. The timing generator 34 produces a wave form having two operative periods 50 and 52. During period 50, the signal selector 36 is activated to pass the portion of the original composite video signal 44 to the buffer amplifier 38. During period 52, the signal selector 36 is activated to pass the inverted signal 42 from the inverter 26 to the buffer amplifier 38. The output signal sent from the selector 36 to the buffer amplifier 38 is illustrated in FIG. 2E.

Figure 3:
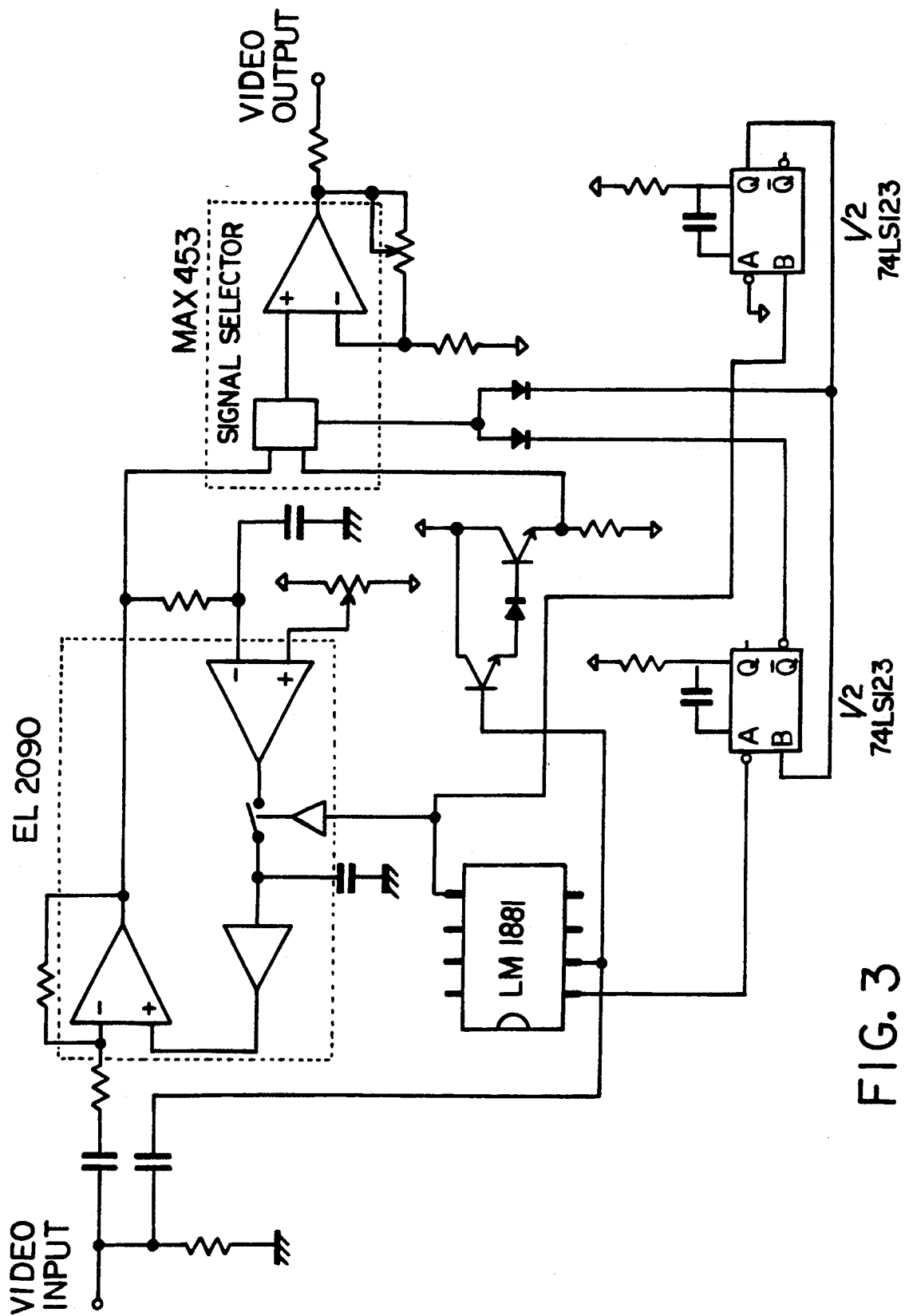
FIG. 3 is a schematic illustration of an embodiment of circuitry used in implementing the apparatus and method of the present invention.

Reference is now made to FIG. 3 which is a schematic illustration of a possible implementation of the present invention. The effect of complexity reduction of the present invention can be appreciated by noticing the fact that only four small-scaled ICs are used to accomplish the negative-to-positive conversion. It's certainly possible to integrate most components in this schematic into a single integrated circuit to further reduce the complexity and the cost of the negative-to-positive conversion.

In the embodiment of circuitry shown in FIG. 3, an EL 2090, manufactured by Elantec, Inc., is configured to perform multiple functions. Part of the EL 2090 is used to perform the functions of the DC level restore 20 and the DC level control circuit 22 of FIG. 1. The rest of the EL 2090 is a differential video amplifier which is used to perform the function of the inverter 26 of FIG. 1. An LM1881, manufactured by National Semiconductor Corporation, is used to function as the sync stripper circuit 30 of FIG. 1. The function of the timing circuit 34 of FIG. 1 is performed by a 74LS123 manufactured by Texas Instruments, Inc. The functions of the signal selector 36 and the buffer amplifier 38 of FIG. 1 are both performed by an MAX453 manufactured by Maxim Integrated Products, Inc.

Figure 4:
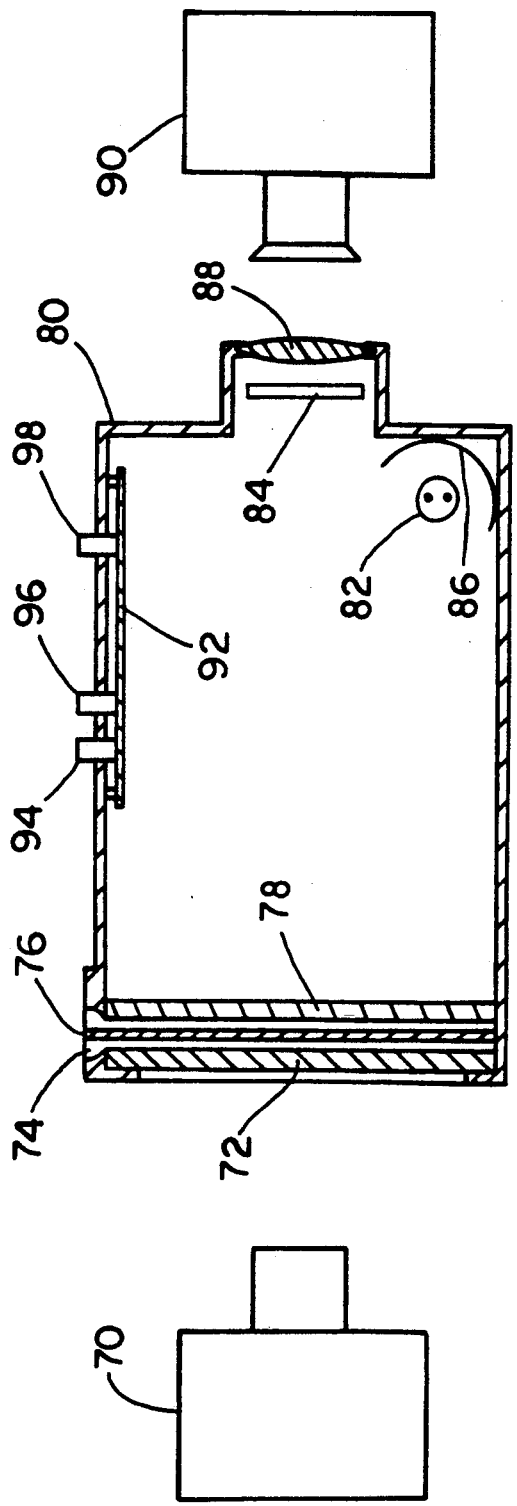
FIG. 4 is an illustration of a photo/film to video transfer apparatus in which the conversion system of the present invention has been incorporated.

Reference is now made to FIG. 4 which illustrates another preferred embodiment of the present invention in which a photo/film to video transferring system is constructed and operative in accordance with the present invention. The transferring system comprises a housing 80 with a macro lens 88 mounted on one end and a photo inlet and glass screen assembly mounted on the other end. The photo inlet and glass screen assembly comprises an opaque glass screen 72, a transparent glass 78 and a narrow opening 74 for insertion of a photo 76. A small clearance is formed between the glass screen 72 and the transparent glass 78 which is in alignment with the narrow opening for insertion of the photo 76.

A processing circuit board 92, on which the circuitry of the conversion system of the present invention is contained, is mounted on one side wall of the housing 80. It is a particular feature of the present invention that a lamp 82 and associated reflecting mirror 86 is mounted at a portion of the housing most remote or farthest from the photo 76 to be transferred. The distinguishing effect from prior art due to such arrangement is that the illumination on the photo is more uniformly distributed. A film/slide inlet slot 84 is formed on one side of the housing near the macro lens 88 for insertion of a film or a slide. This inlet slot 84 is located adjacent to the side of the macro lens 88 facing the interior of the housing 80.

There are several different operational modes depending on whether a photo or a film/slide is to be transferred and whether a projector is used for the film/slide transfer. If a photo is to be transferred, the lamp 82 will be turned on to provide even illumination on the photo. If a projector is used for a film/slide to video transfer or a cine film projector is being used, the images from the film/slide projector or the cine film projector 70 will be projected onto the glass screen 72. The glass screen is an opaque sheet of glass as is well known in the art. If the film being projected is a negative color film, a blue-tinted filter should be placed either at the photo inlet slot 74 or the film/slide inlet slot 84 to cancel the orange color shift of the negative color film. The film/slide-to-video transfer can also be accomplished by placing the film/slide in the inlet slot 84. The illumination for the film/slide can be provided by shining the light from the lamp 82 to a sheet of white material at the place of the photo 76. If a negative color film is being transferred this way, the white paper should be replaced by a blue paper to provide the color correction. In any of the above operational modes, the images will finally be projected on the light detecting surface of the video camera 90 by the macro lens 88 in combination with the lens on the video camera 90. The audio and the video signals from the video camera will be fed into the processing circuit board 92 via connectors 94 and 96, respectively. From the circuit board 92, the processed signals can be sent to a TV receiver via the connector 98.

Figure 5:
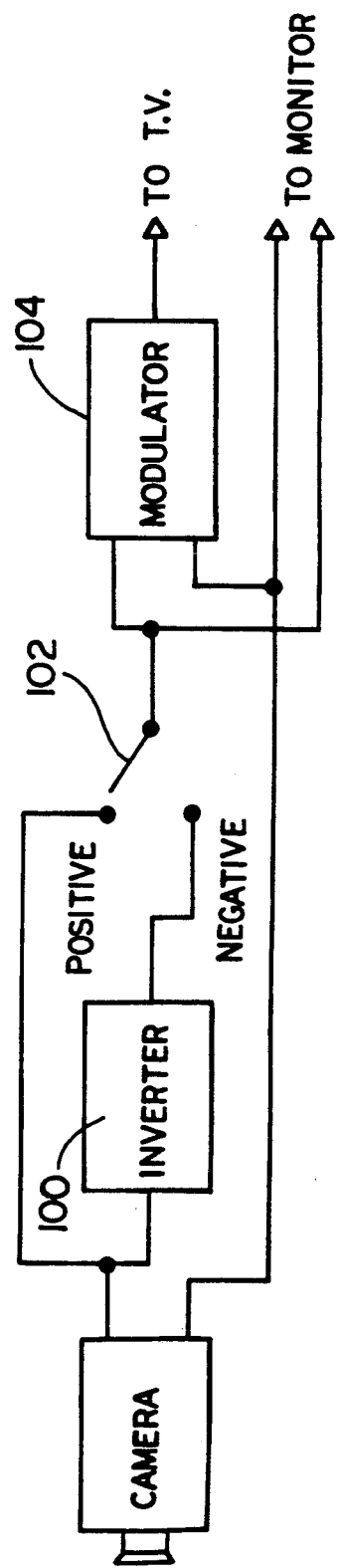
FIG. 5 is a block diagram showing a camera and a schematic of circuitry of the system of the present invention.

Reference is now made to FIG. 5 which illustrates the diagram of the electric connections of the transferring system. When positive images are being transferred from positive sources, such as slides or photos, the video signal from the video camera is sent directly to a video monitor and/or the RF modulator 104. When negative images are being transferred from negative films, the negative mode is selected by the switch 102. The signal from the negative-to-positive converter 100, which is a circuit implementation of the conversion system of the present invention, is sent to the video monitor and/or the RF modulator. The RF modulator 104 is used to produce broadcasting TV signals from the video signal and the audio signal. The output of the modulator 104 can be directly connected to the antenna input of a TV receiver.

Figure 6:
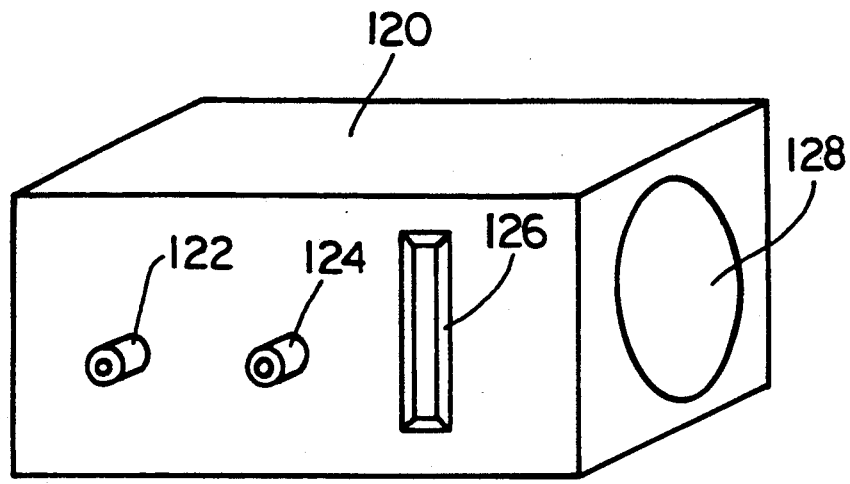
FIG. 6 is a pictorial view of a film/slide projector that incorporates the conversion system of the present invention.

Reference is now made to FIG. 6 which illustrates another preferred embodiment of the present invention in which a electronic slide/film projecting system is constructed and operative in accordance with the present invention. The projecting system comprises a compact housing 120 with a macro lens 128 mounted on one end. There is a film/slide inlet slot 126 in the housing 120 for insertion of a film or a slide to be projected or transferred. Video signals from a video camera are send to a signal processing circuit board inside the housing via connector 122 and the output signals from the circuit board is send to a TV monitor via another connector 124.

Figure 7:
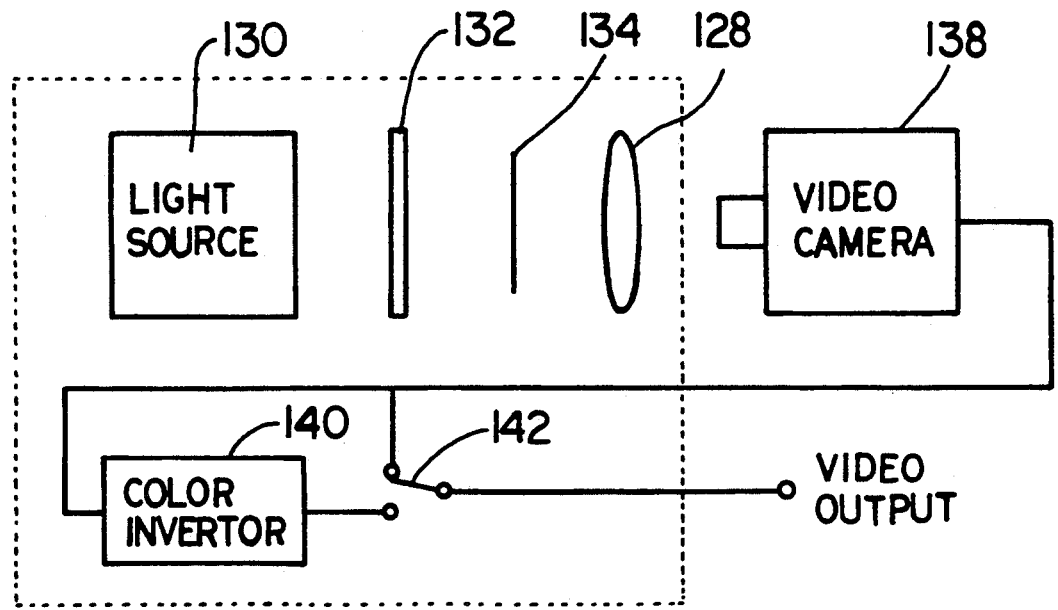
FIG. 7 is a diagrammatic illustration of the apparatus and conversion system of FIG. 6.

Reference is now made to FIG. 7 which is a diagrammatic illustration of the system of FIG. 6. A light source 130 provides uniformly distributed illumination to the film or slide 134 to be projected. Lens 128 in conjunction with the lens on the video camera 138 forms a clear image of the film 134 on the light detecting surface of the camera 138. The composite video signal that is generated by the camera is fed into circuit 140, which is a circuit implementation of the present invention, to accomplish the negative-to-positive conversion. The switch 142 is used to pass the original signal or the inverted signal according to whether a positive or a negative composite video signal is generated by the camera. Switch 142 also places a blue-tinted filter 132 in the light path when a negative file is to be projected. Components enclosed in the area defined by the dotted line are all housed in the compact housing 120.

Figure 8:
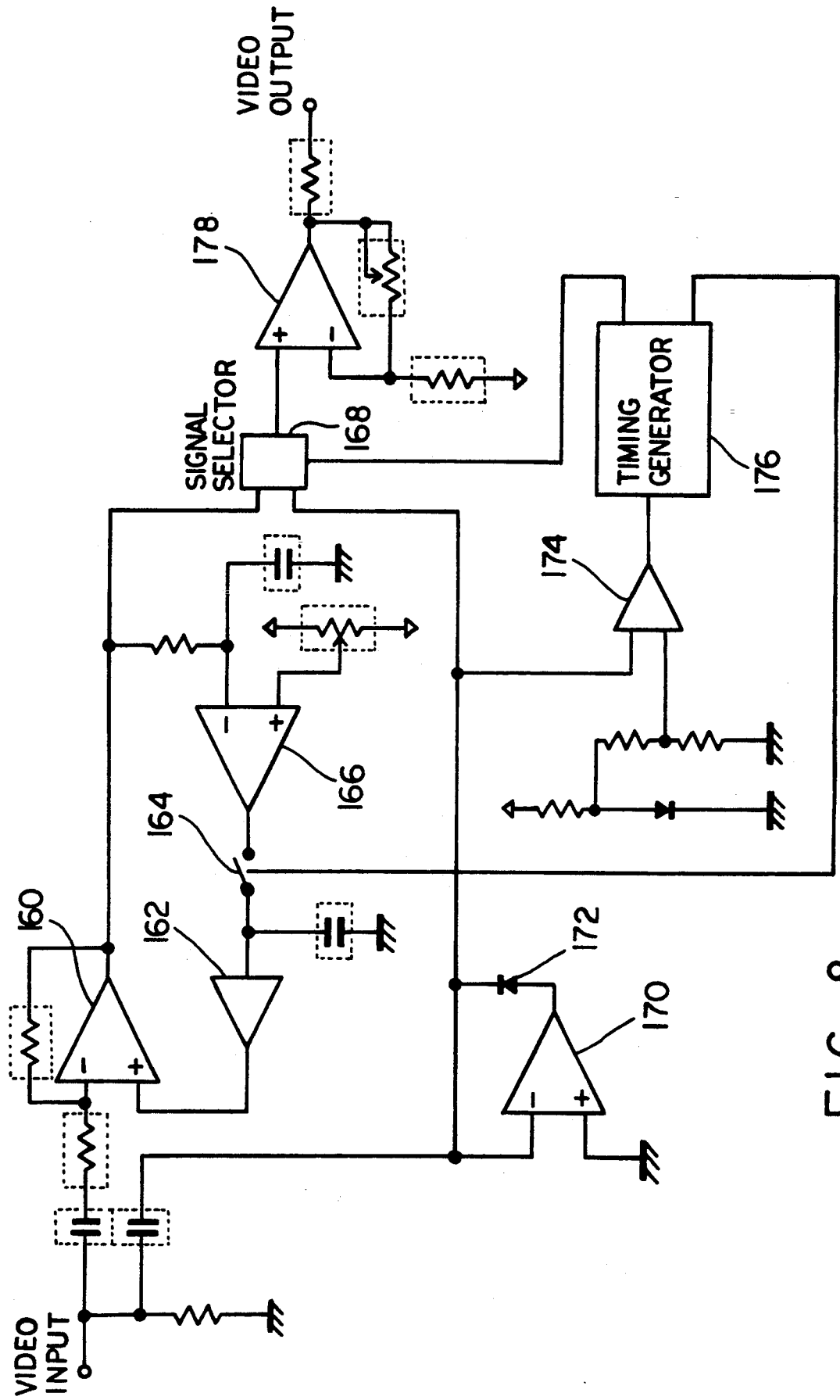
FIG. 8 is a schematic diagram of an integrated circuit for negative-to-positive conversion of video signals in accordance with the present invention.

Reference is now made to FIG. 8 which illustrates the internal circuit of a integrated circuit which is constructed and operative in accordance with the present invention to facilitate and simplify the construction of an apparatus for the negative-to-positive conversion. Components surrounded by dotted lines are external components. Wide-band amplifier 160, DC amplifier 162, sampling switch 164 and comparator 166 constitute a video signal inverter with DC level restoring and controlling. The output of this inverter is fed to signal selector 168. Diode 172 and comparator 170 form a black level clamp circuit. Comparator 174 and associated circuit form a sync signal stripper which provides the composite sync signal to the timing generator 176. The timing generator circuit 176 produces two control signals to sampling switch 164 and the signal selector 168, respectively. Under the control of appropriate timing signal, the output from the signal selector will be the desired signal which will be amplified by the buffer amplified 178 and sent to a video monitor (not shown in the figure).

Although preferred embodiments of the transfer system and apparatus of the present invention have been illustrated and described, it is to be understood that the present disclosure is made by way of example and that various other embodiments are possible without departing from the subject matter coming within the scope of the following claims, which subject matter is regarded as the invention.

I claim:

1. A method of electronically processing a negative composite video signal, such as is produced by a video camera scanning an image from a negative film, to convert the negative composite video signal to a positive composite video signal without separating the luminance component and chrominance component from the negative composite video signal, said method comprising the steps of simultaneously feeding the negative composite video signal to an inverter, to a switching means and to a timing control means;

feeding the inverted composite video signal from the inverter to said switching means;

generating a control signal by the timing control means that has two distinguishing states corresponding to blanking periods and image periods, respectively; and using the control signal to control said switching means so that (1) horizontal blanking portions of the negative composite video signal are fed through said switching means as they are received by the switching means, and (2) image portions of the inverted composite video signal between adjacent horizontal blanking portions are fed through the switching means as they are received by the switching means, whereby an output positive composite video signal comes from said switching means and consists of the horizontal blanking portions of said negative composite video signal and the inverted image portions of said inverted composite video signal that are fed through said switching means.

2. Apparatus for electronically processing a negative composite video signal, such as is produced by a video camera scanning an image from a negative film, to convert the negative composite video signal to a positive composite video signal without separating the luminance component and chrominance component from the negative composite video signal, said apparatus comprising first signal processor means for receiving the composite negative video signal and producing a DC level restored first intermediate video signal consisting of horizontal blanking portions and image portions between said horizontal blanking portions;

second signal processor means for receiving said composite negative video signal to produce a DC level restored second intermediate video signal consisting of inverted horizontal blanking portions and inverted image portions between said inverted horizontal blanking portions;
controller means;
means for feeding said first and second intermediate video signals to said controller means;
said controller means being capable of passing the horizontal blanking portions of the first intermediate video signal and the inverted image portions of the second intermediate video signal so as to produce an output composite positive video signal consisting of the horizontal blanking portions of said first intermediate video signal and the inverted image portions of said second intermediate video signal.

3. Apparatus in accordance with claim 2, further comprising modulator means that receives the composite positive video signal from said controller means and produces broadcasting TV signals from said composite positive video signal such that the broadcasting TV signals can be applied directly to the antenna of a TV receiver.

4. Apparatus in accordance with claim 2, further comprising
a housing;
a macro lens mounted on a first side of said housing;
means for positioning a film containing an image thereon adjacent to said macro lens so that said film is positioned on the side of said macro lens facing the interior of said housing;
an opaque glass screen mounted on the side of said housing opposite to said first side of said housing;
a transparent glass mounted inside said housing and adjacent to said opaque glass screen;
a small clearance formed between said glass screen and said transparent glass for receiving a photograph; and
a light source mounted inside said housing at a position adjacent to said first side of said housing.

5. Apparatus in accordance with claim 4, further comprising modulator means that receives the composite positive video signal from said controller means and produces broadcasting TV signals from said composite positive video signal such that the broadcasting TV signals can be applied directly to the antenna of a TV receiver.

6. Apparatus in accordance with claim 5, further comprising means for selectively placing a blue-tinted filter between said macro lens and said transparent glass when said photo or film has a negative color image thereon.

7. Apparatus in accordance with claim 4, further comprising means for selectively placing a blue-tinted filter between said macro lens and said transparent glass when said photo or film has a negative color image thereon.

8. Apparatus in accordance with claim 2, further comprising
a housing;
a macro lens mounted on a first side of said housing;
a slide/film inlet slot formed on one side of said housing such that a slide/film inserted in said slot will be parallel to said lens;
a light source assembly mounted inside the housing such that said slide/film inlet slot is between the light source and said macro lens;
a blue-tinted filter; and
means for removably placing the blue-tinted filter between the light source and said macro lens.

9. Apparatus in accordance with claim 8, further comprising modulator means that receives the composite positive video signal from said controller means and produces broadcasting TV signals from said composite positive video signal such that the broadcasting TV signals can be applied directly to the antenna of a TV receiver.

10. An integrated circuit for electronically processing a negative composite video signal, such as is produced by a video camera scanning an image from a negative film, to convert the negative composite video signal to a positive composite video signal without separating the luminance component and chrominance component from the negative composite video signal, said integrated circuit comprising
a video signal inverting amplifier and DC level restoring circuit which receives said negative composite video signal and generates a DC level restored and inverted first intermediate signal;
a second DC level restoring circuit which receives said negative composite video signal and generates a DC level-restored second intermediate signal;
a video-band analog switching circuit for selectively passing through said first or second intermediate signal to produce a positive composite video output signal;
a video signal non-inverting amplifier which receives the output signal from said video-band analog switching circuit and adjusts the amplitude of said output signal;
a sync signal stripper circuit which receives said negative composite video signal and separates sync pulses from said negative composite video signal; and
a control timing generator circuit which receives the sync pulses from said sync signal stripper circuit and generates control signals that control the switching action of said video-band analog switching circuit.

11. Apparatus for transferring an image from a photo or a film to a video camera, said apparatus comprising
a housing;
a macro lens mounted on a first side of said housing;
means for positioning a film containing an image thereon adjacent to said macro lens so that said film is positioned on the side of said macro lens facing the interior of said housing;
an opaque glass screen mounted on the side of said housing opposite to said first side of said housing;
a transparent glass mounted inside said housing and adjacent to said opaque glass screen;
a small clearance formed between said glass screen and said transparent glass for receiving a photograph; and
a light source mounted inside said housing at a position adjacent to said first side of said housing.

* * * * *